United States Patent [19]
Dodson

[11] Patent Number: 4,845,876
[45] Date of Patent: Jul. 11, 1989

[54] GRASPING GAFF

[76] Inventor: Clifford Dodson, 128 Garrett St., Apt. C, Chula Vista, Calif. 92010

[21] Appl. No.: 219,252

[22] Filed: Jul. 15, 1988

[51] Int. Cl.[4] .......................................... A01K 97/14
[52] U.S. Cl. ...................................................... 43/5
[58] Field of Search ................... 43/5; 294/19.1, 19.3; 119/154

[56] References Cited

U.S. PATENT DOCUMENTS

| | | | |
|---|---|---|---|
| 1,002,709 | 9/1911 | Kromann | 294/19.3 |
| 1,056,343 | 3/1913 | Kromann | 43/5 |
| 2,122,264 | 6/1938 | Porter | 119/154 |
| 3,018,579 | 1/1962 | Girden | 43/5 |
| 3,833,252 | 9/1974 | Redding | 43/5 |
| 3,922,027 | 11/1975 | Nesselt | 294/19.3 |
| 3,978,605 | 9/1976 | Maruniak | 43/5 |

FOREIGN PATENT DOCUMENTS

| | | | |
|---|---|---|---|
| 958971 | 9/1949 | France | 43/5 |
| 1115015 | 12/1955 | France | 43/5 |

Primary Examiner—M. Jordan
Attorney, Agent, or Firm—Keith D. Beecher

[57] ABSTRACT

A self-activated gaff which responds to contact of a trigger bar with an object to cause a pair of tongs to close and embrace the object and to lock around the object until released. The gaff uses a piston-like member and a pair of constant force means to couple the piston-like member to the tongs.

7 Claims, 2 Drawing Sheets

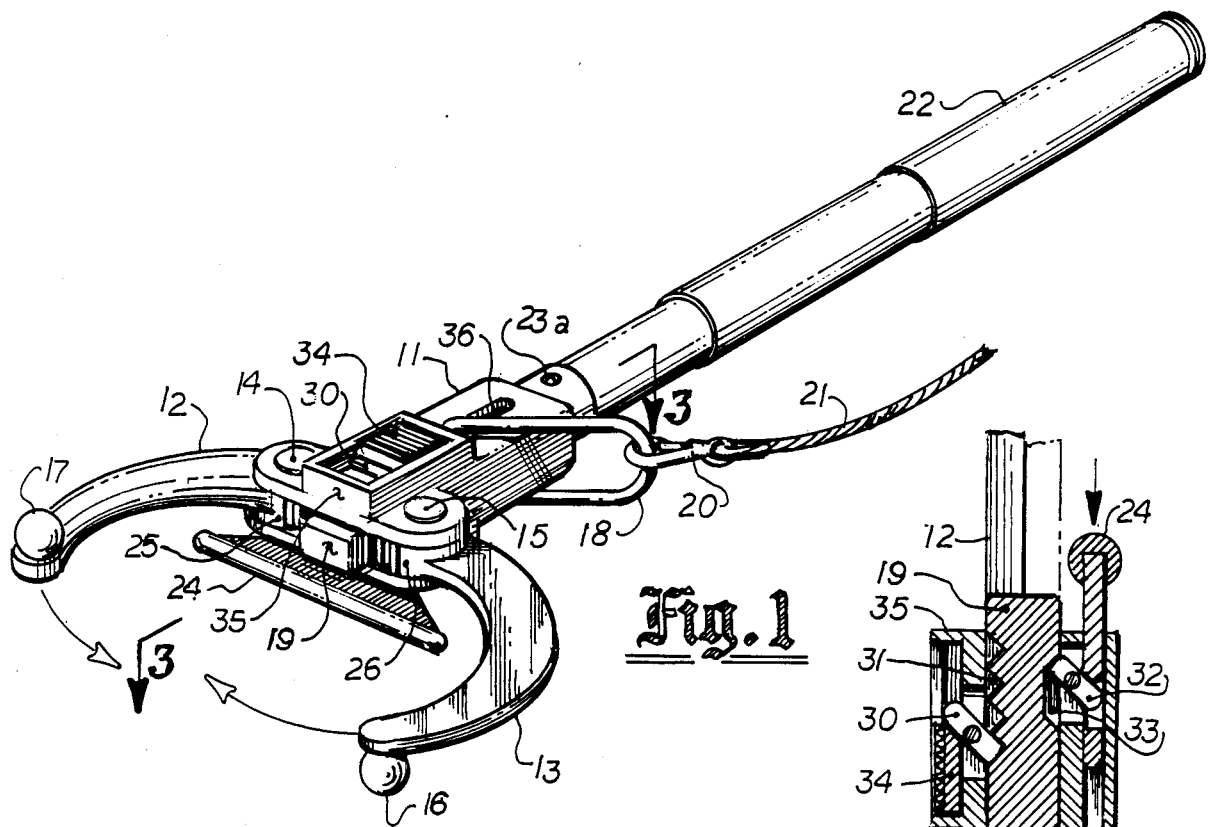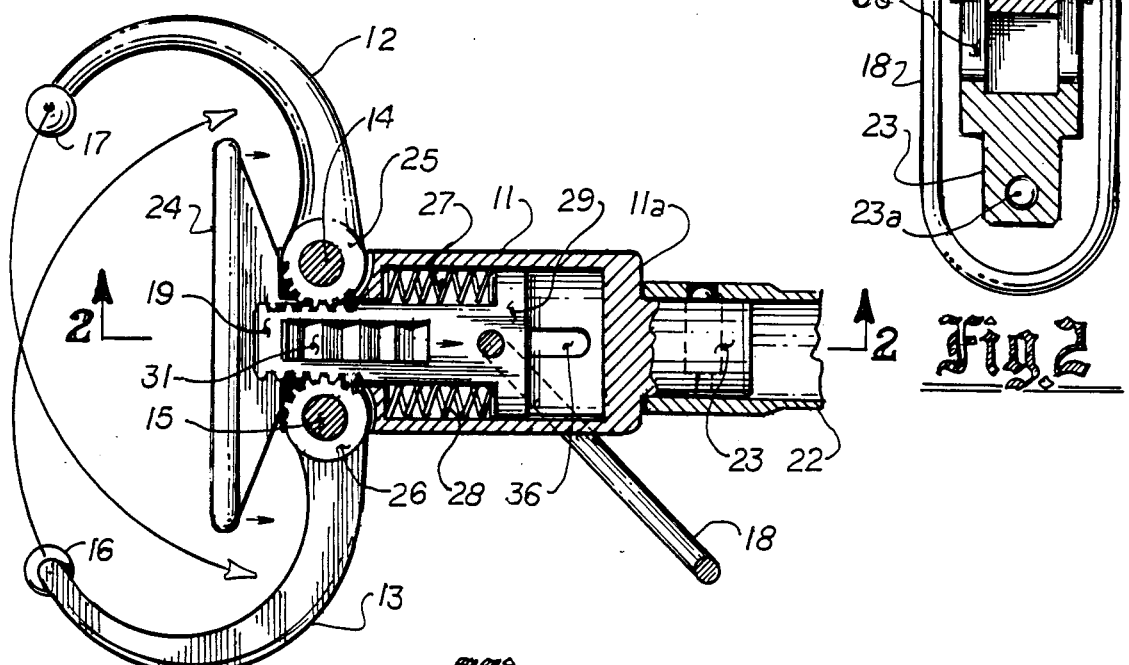

GRASPING GAFF

BACKGROUND OF THE INVENTION

An important objective of the present invention is to provide a different type of gaff from the prior art harpoon or hook gaff, which when used for handling and landing heavy fish grasps the fish without mutilating or tearing the fish.

Another objective of the invention is to provide such an improved grasping gaff which may also be used for rescuing humans and animals from drowning, fires, and other hazards; and for capturing humans and animals without injury.

Yet another objective of the invention is to provide such an improved gaff which may be readily dismantled and stored in a relatively small space.

SUMMARY OF THE INVENTION

The invention provides a grasping gaff which includes a pair of tongs which close on a particular object upon contact of the object with a trigger mechanism. The tongs may subsequently be released by the manual release of the tong-locking mechanism.

BRIEF DESCRIPTION OF THE DRAWING

FIG. 1 is a perspective view of a grasping gaff representing one embodiment of the invention;

FIG. 2 is a section taken essentially along the line 2—2 of FIG. 3;

FIG. 3 is a section taken essentially along the line 3—3 of FIG. 1;

DETAILED DESCRIPTION OF THE ILLUSTRATED EMBODIMENT

Figure 4:
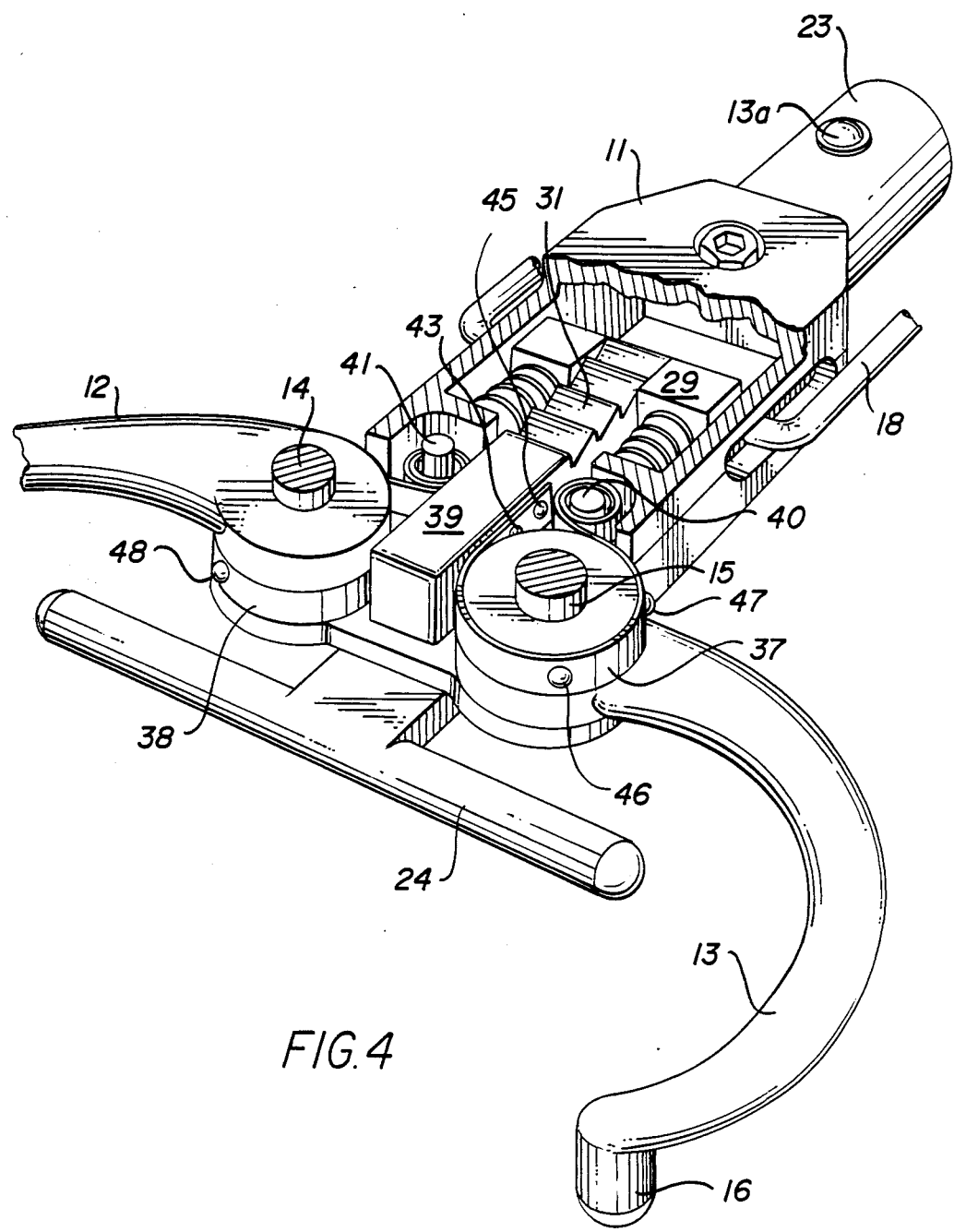
FIG. 4 is a perspective view of a second embodiment of the grasping gaff.

The grasping gaff of the invention in the embodiment shown in FIGS. 1-3 includes a hollow cylindrical head 11. A pair of tongs 12 and 13 are pivotally mounted on the forward end of head 11. Bail-type grips 16 and 17 are mounted on the distal ends of the tongs.

A piston-like member in the form of a rack 19 is slidably mounted in head 11. The rack includes an integral base 29 of an enlarged diameter with respect to the remaining portion of the rack and which slides along the bore surface of head 11. The rack also includes an integral shaft 23 which extends through the rear end of head 11.

A buckle 18 is pivotally coupled to rack 19, and a line 21 is removably attached to the buckle by means of a hook 20. The bucklet extends through slots 36 in head 11.

A tubular handle 22 made up of a plurality of self-locking telescopic tubes is removably attached to shaft 23 by means of a spring-loaded plunger 23a.

Gears 14 and 15 are formed integral with the inner ends of tongs 12, and these gears engage corresponding series of teeth on opposite sides of rack 19. A pair of springs 27 and 28 bias the rack 19 towards the forward end of the head 11 to cause the tongs 12, 13 to close when the rack is released.

Rack 19 is held in its illustrated cocked position by a pawl 32. Pawl 32 is pivotally mounted in a housing 35 attached to head 11, and it engages one end of a slot 33 in rack 19 when in its cocked position illustrated in FIG. 2. A trigger bar 24 is movably mounted in head 11, and it engages pawl 32 to release the pawl when the trigger bar impacts an object and is moved towards head 11 by the object.

A second pawl 30 engages teeth 31 on the opposite side of the rack. Pawl 30 serves to lock the rack in successive positions as it moves to the forward end of head 11. This action serves to lock tongs 12, 13 about the object grasped by the tongs. Pawl 30 and tongs 12, 13 may be subsequently released by sliding a thumblock 34 along housing 35.

To operate the gaff, the tubular telescoping tubes forming handle 22 are extended and locked together, and the handle is coupled to shaft 23 by sliding the front end of the handle over the shaft and turning the handle until it is locked to the shaft by plunger 23a.

The thumblock 54 is then moved to the position shown in FIG. 2, and the tongs are pulled apart. This action causes rack 19 to move into head 11 against the force of springs 27, 28. The head is so moved to the position of FIG. 2 in which it is cocked by pawl 32.

The gaff is then moved towards the object to be grasped by tongs 12, 13, until the object impacts trigger bars 24 and pushes the trigger bar towards head 11. This action releases pawl 33, and springs 27 and 28 drive rack 19 forward to close the tongs about the object. The tongs are locked in their closed position by pawl 30. A pull on line 21 will further force the closure of tongs 12 and 13. As stated above, the tongs may be subsequently released by operating the slide lock 34.

The difference between the embodiment of FIGS. 1-3 and the embodiment of FIG. 4 is the substitution of a pair of commercially available constant force springs 37 and 38 for the rack 19 and gears 14 and 15 of the previous embodiment.

One end of each of the negative springs 37 and 38 is attached to a piston 39 by rivets, such as rivets 43, 45. The springs are also respectively wrapped around the cylindrical portions of tongs 12 and 13 and attached thereto by rivets such as rivets 46, 47 and 48. The free ends of the springs are coiled around posts 40 and 41 respectively.

The springs 37 and 38 perform the same function as the rack 19 and gears 14, 15 of the previous embodiment. However, the replacement of the rack and gears by the negative springs has certain advantages since the entrance of grit, kelp and the like into the rack and gears can affect the proper operation thereof and hinder or prevent closure of the tongs.

The invention provides, therefore, a simple and efficient grasping gaff which may be used in a variety of situations without injury or damage to the object being grasped by the gaff. Also, the gaff may be readily dismounted and stored in a relatively small space.

It will be apparent that although a particular embodiment of the invention has been shown and described, modifications may be made. It is intended in the following claims to cover all modifications which come within the true spirit and scope of the invention.

I claim:

1. An instrument for grasping an object including in combination: a hollow head; a pair of tongs pivotally mounted to one end of said head; an elongated handle; means coupling the handle to the other end of the head; a piston-like member reciprocally movable in said head; means coupling said member to said tongs to cause said tongs to turn about their pivot axis as said member moves with respect to said head; spring means coupled to said piston-like member for biasing said piston-like member in a direction to move said tongs angularly to a closed position; first pawl means engaging said piston-like member releasably to hold said piston-like member in a cocked position against the bias force of said spring means; and trigger means slidably mounted in said head and extending forwardly of said head and coupled to said first pawl means to release said piston-like member upon contact of said trigger means with an object to be grasped by said tongs.

2. The combination defined in claim 1, in which said piston-like member consists of a rack having teeth on opposite sides thereof, and said means coupling said piston-like member to said tongs comprises gears formed on the inner ends of said tongs and engaging said teeth.

3. The combination defined in claim 1, and which includes second pawl means engaging said piston-like member to lock said piston-like member at one or more selected positions after release thereof by said first pawl means.

4. The combination defined in claim 5, and which includes a manually activated lock coupled to said second pawl means for holding said second pawl means in a released position.

5. The combination defined in claim 3, and which includes a line coupled to said member for pulling said member in a direction to close said tongs.

6. The combination defined in claim 3, in which said elongated handle is formed of a plurality of telescopic salt-locking tubes.

7. An instrument for grasping an object including in combination: a head; a pair of tongs pivotally coupled to one end of said head; an elongated handle; means coupling the handle to the other end of the head; a member reciprocally movable with respect to said head; means coupling said member to said tongs to cause said tongs to turn about their pivot axis as said member moves with respect to said head; said coupling means comprising a piston-like member and a pair of constant force means coupling said piston-like member to said tongs.

* * * * *